United States Patent
McGowan et al.

(10) Patent No.: US 11,242,850 B2
(45) Date of Patent: Feb. 8, 2022

(54) SCAVENGE GEAR ASSEMBLY FOR AN OIL PUMP OF A VEHICLE

(71) Applicant: GM Global Technology Operations LLC, Detroit, MI (US)

(72) Inventors: Sean M. McGowan, Northville, MI (US); Mark R. Claywell, Birmingham, MI (US); Chung Y. Wei, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 16/534,524

(22) Filed: Aug. 7, 2019

(65) Prior Publication Data

US 2021/0040947 A1  Feb. 11, 2021

(51) Int. Cl.
*F04C 2/08* (2006.01)
*B62D 25/08* (2006.01)
*F01M 1/02* (2006.01)
*B62D 25/00* (2006.01)

(52) U.S. Cl.
CPC .............. *F04C 2/084* (2013.01); *B62D 25/00* (2013.01); *B62D 25/082* (2013.01); *F01M 1/02* (2013.01); *F01M 2001/0238* (2013.01); *F04C 2210/206* (2013.01)

(58) Field of Classification Search
CPC .......... F04C 2/084; F04C 2/18; F04C 11/001; F04C 15/0073; F04C 2210/206; B62D 25/082; B62D 25/00; F01M 1/02; F01M 2001/0238
USPC ....................................................... 418/206.1
See application file for complete search history.

(56) References Cited

U.S. PATENT DOCUMENTS

| 4,106,361 | A | * | 8/1978 | Burtis | ........................ B23F 5/12 409/37 |
| 5,092,751 | A | * | 3/1992 | Viktora | .................... F04C 2/084 418/1 |
| 5,755,566 | A | * | 5/1998 | Marsillo | .................. F04C 2/123 418/200 |
| 2009/0148333 | A1 | * | 6/2009 | Elder | ....................... F04C 2/086 418/206.7 |
| 2016/0230620 | A1 | * | 8/2016 | Bucher | .................... F04C 14/00 |
| 2017/0107872 | A1 | * | 4/2017 | McGowan | .......... F04C 15/0026 |
| 2018/0045197 | A1 | * | 2/2018 | Henry | .................... F16K 5/0285 |

* cited by examiner

*Primary Examiner* — Audrey B. Walter
*Assistant Examiner* — Dapinder Singh
(74) *Attorney, Agent, or Firm* — Vivacqua Crane PLLC

(57) ABSTRACT

A gear assembly of a scavenge oil pump for a vehicle is provided. The assembly comprises a first pair of meshing gears comprising a first drive gear disposed about a drive shaft and a first slave gear disposed about a slave drive in parallel relationship with the drive shaft. The first drive gear and first slave gear are in rotational meshing cooperation. The assembly comprises a second pair of meshing gears comprising a second drive gear disposed about the drive shaft and a second slave gear disposed about the slave drive. The second drive gear and second slave gear are in rotational meshing cooperation. The second pair of meshing gears is disposed linearly adjacent to the first pair of meshing gears. The first pair and the second pair of meshing gears have about ⅜ of a tooth spacing relative to each other for torque transmission of scavenge oil.

20 Claims, 3 Drawing Sheets

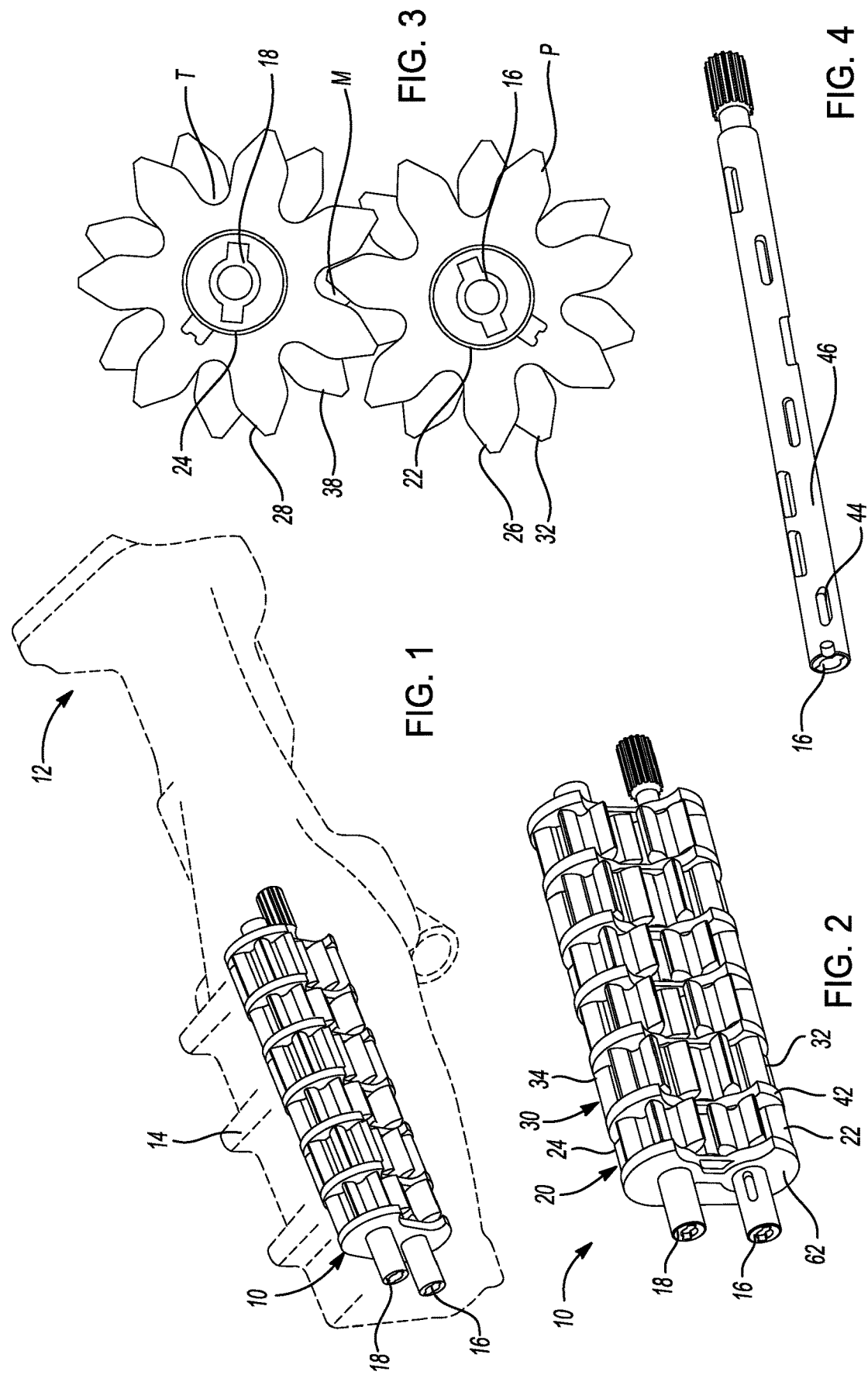

SCAVENGE GEAR ASSEMBLY FOR AN OIL PUMP OF A VEHICLE

INTRODUCTION

The present disclosure relates to gear assemblies for an oil pump and, more particularly, a scavenge gear assembly for a scavenge oil pump of a vehicle.

Pumps having meshing gears experience continual pressure pulses, horsepower loss, torque oscillation to the gear drive shaft, noise, vibration, and harshness. Pumps also experience increased scavenge backpressure which affects oil aeration. While current pumps achieve their intended purposes, there is a need for improvement to reduce pressure pulses, horsepower loss, torque oscillation to the gear drive shaft, noise, vibration, and harshness along with decreasing scavenge backpressure.

SUMMARY

According to several aspects, a scavenge gear assembly of a scavenge oil pump for a vehicle is provided. In one aspect, the scavenge gear assembly comprises a drive shaft and a slave drive or slave drive shaft in parallel relationship. The assembly further comprises a first pair of meshing gears comprising a first drive gear and a first slave gear identical to the first drive gear. The first drive gear is rotationally disposed about the drive shaft and the first slave gear is rotationally disposed about the slave drive shaft. The first drive gear and first slave gear are in rotational meshing cooperation for torque transmission. Each of the first drive gear and the first slave gear has teeth equally disposed thereabout.

In this aspect, the assembly comprises a second pair of meshing gears comprising a second drive gear and a second slave gear identical to the second drive gear. The second drive gear is rotationally disposed about the drive shaft and the second slave gear is rotationally disposed about the slave drive shaft. The second drive gear and second slave gear are in rotational meshing cooperation for torque transmission. The second pair of meshing gears is disposed linearly adjacent to the first pair of meshing gears. Each of the second drive gear and the second slave gear has teeth equally disposed thereabout.

The assembly further comprises a dividing plate disposed between the first and second pair of meshing gears. In this aspect, the first pair of meshing gears and the second pair of meshing gears have about 3/8 of a tooth spacing relative to each other for torque transmission of scavenge oil. In one embodiment, each of the first drive gear, the first slave gear, the second drive gear and the second slave gear has seven teeth disposed thereabout.

In one embodiment, the drive shaft comprises a first keyway formed thereon and a second keyway formed longitudinally adjacent the first keyway. the first drive gear is disposed on the first keyway and the second drive gear disposed on the second keyway such that the first and second drive gears are disposed longitudinally adjacent to each other. The first keyway of the drive shaft is angularly aligned with the apex of one tooth of the first drive gear and the second keyway of the drive shaft is angularly aligned with the apex of one tooth of the second drive gear.

In this embodiment, the first keyway and the second keyway of the drive shaft are longitudinally adjacent and angularly spaced about 19.29 degrees from each other to provide about 3/8 of a tooth spacing.

In another embodiment, each of the first drive gear, the first slave gear, the second drive gear and the second slave gear is a spur gear. In yet another embodiment, the assembly further comprises a first end plate disposed on the first pair of meshing gears and an opposing second end plate disposed on the second pair of meshing gears.

In another aspect, a scavenge gear assembly of a scavenge oil pump for a vehicle is provided. In this aspect, the gear assembly comprises a drive shaft and a slave drive shaft in parallel relationship. The assembly further comprises a first pair of meshing gears comprising a first drive gear and a first slave gear identical to the first drive gear. The first drive gear is rotationally disposed about the drive shaft and the first slave gear is rotationally disposed about the slave drive shaft. The first drive gear and first slave gear are in rotational meshing cooperation for torque transmission. Each of the first drive gear and the first slave gear has teeth equally disposed thereabout.

The assembly further comprises a second pair of meshing gears comprising a second drive gear and a second slave gear identical to the second drive gear. The second drive gear is rotationally disposed about the drive shaft and the second slave gear is rotationally disposed about the slave drive shaft. The second drive gear and second slave gear are in rotational meshing cooperation for torque transmission. The second pair of meshing gears is disposed linearly adjacent to the first pair of meshing gears. Each of the second drive gear and the second slave gear has teeth equally disposed thereabout.

In this embodiment, the assembly further comprises a dividing plate disposed between the first and second pair of meshing gears. The first pair of meshing gears and the second pair of meshing gears have a tooth spacing determined by an average of a sum of a first optimum for reducing pumping pulse and a second optimum for reducing meshing pulse. In this embodiment, the first optimum is represented by ½N and the second optimum is represented by ¼N, where N is the number of teeth per gear or pulsations per gear revolution.

In one embodiment, each of the first drive gear, the first slave gear, the second drive gear and the second slave gear has seven teeth disposed thereabout.

In another embodiment, the drive shaft comprises a first keyway formed thereon and a second keyway formed longitudinally adjacent the first keyway. The first drive gear is disposed on the first keyway and the second drive gear is disposed on the second keyway such that the first and second drive gears are disposed longitudinally adjacent to each other. Moreover, the first keyway of the drive shaft is angularly aligned with the apex of one tooth of the first drive gear and the second keyway of the drive shaft is radially aligned with the apex of one tooth of the second drive gear.

Furthermore, the first keyway and the second keyway of the drive shaft are angularly spaced about 19.29 degrees from each other to provide the tooth spacing of the average of the sum of the first optimum and the second optimum.

In another embodiment, each of the first drive gear, the first slave gear, the second drive gear and the second slave gear is a spur gear.

In yet another embodiment, the assembly further comprises a first end plate disposed on the first pair of meshing gears and an opposing second end plate disposed on the second pair of meshing gears.

In another aspect, a vehicle having a scavenge gear assembly for a scavenge oil pump is provided. In this aspect, the vehicle comprises a chassis and a body supported by the chassis. The body includes a motor compartment and an occupant zone. The motor compartment includes the scavenge gear assembly for the scavenge oil pump of the vehicle.

In this embodiment, the assembly comprises a drive shaft and a slave drive shaft in parallel relationship. The assembly further comprises a first pair of meshing gears comprising a first drive gear and a first slave gear identical to the first drive gear. The first drive gear is rotationally disposed about the drive shaft and the first slave gear is rotationally disposed about the slave drive shaft. The first drive gear and first slave gear are in rotational meshing cooperation for torque transmission. Each of the first drive gear and the first slave gear has teeth equally disposed thereabout.

In this embodiment, the assembly further comprises a second pair of meshing gears comprising a second drive gear and a second slave gear identical to the second drive gear. The second drive gear is rotationally disposed about the drive shaft and the second slave gear is rotationally disposed about the slave drive shaft. The second drive gear and second slave gear are in rotational meshing cooperation for torque transmission. The second pair of meshing gears is disposed linearly adjacent to the first pair of meshing gears. Each of the second drive gear and the second slave gear has teeth equally disposed thereabout. The assembly further comprises a dividing plate disposed between the first and second pair of meshing gears.

In another embodiment, the assembly further comprises first and second end plates. The first end plate is disposed on one end of a pump manifold or train and the other end plate is disposed on another end of the pump manifold.

In one embodiment, the first pair of meshing gears and the second pair of meshing gears have about ⅜ of a tooth spacing relative to each other for torque transmission of scavenge oil.

In one embodiment, the drive shaft comprises a first keyway formed thereon and a second keyway formed longitudinally adjacent the first keyway. The first drive gear is disposed on the first keyway and the second drive gear is disposed on the second keyway such that the first and second drive gears are disposed longitudinally adjacent to each other. The first keyway of the drive shaft is angularly aligned with the apex of one tooth of the first drive gear and the second keyway of the drive shaft is angularly aligned with the apex of one tooth of the second drive gear.

Furthermore, the first keyway and the second keyway of the drive shaft are angularly spaced about 19.29 degrees from each other to provide about ⅜ of a tooth spacing.

In another embodiment, each of the first drive gear, the first slave gear, the second drive gear and the second slave gear is a spur gear.

In yet another embodiment, the assembly further comprises a first end plate disposed on the first pair of meshing gears and an opposing second end plate disposed on the second pair of meshing gears.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is an environmental view of a scavenge gear assembly for an oil pump of a vehicle in accordance with one embodiment of the present disclosure.

FIG. 2 is a perspective view of the assembly in FIG. 1.

FIG. 3 is an end view of first and second pairs of meshing gears of the scavenge gear assembly according to an exemplary embodiment.

FIG. 4 is a perspective view of a drive shaft of the scavenge gear assembly in FIG. 1.

DETAILED DESCRIPTION

Figure 5:
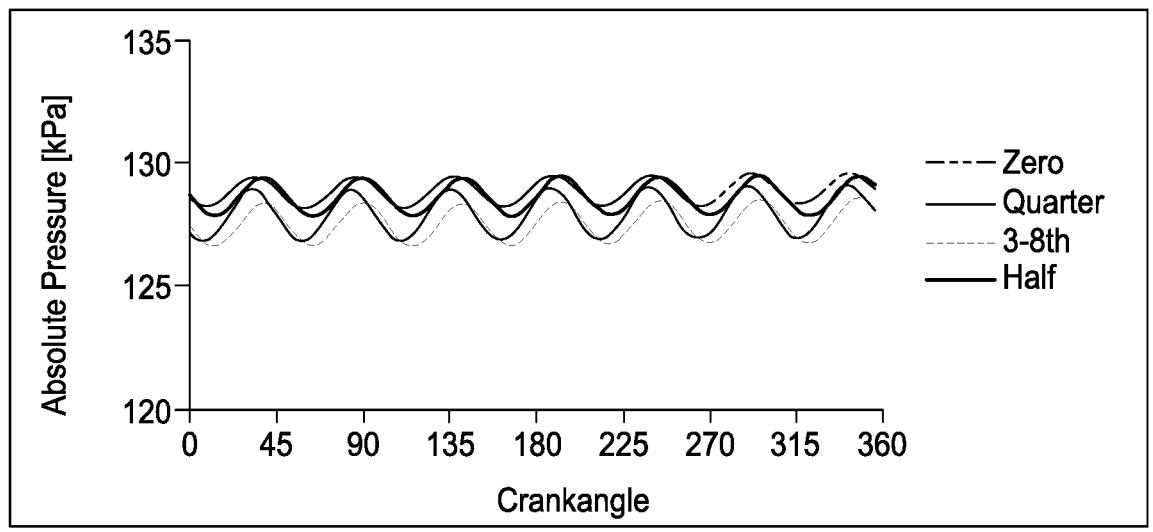
FIG. 5 is a graph showing outlet pressure of meshing gears having differing tooth spacing.

The following description is merely exemplary in nature and is not intended to limit the present disclosure, application, or uses.

FIG. 1 Illustrates a scavenge gear assembly 10 for a scavenge oil pump 12 of a vehicle in accordance with one embodiment of the present disclosure. Preferably, the assembly 10 is connected to the pump by way of an intermediate shaft (not shown) and is housed in a casting or housing 14 in fluid communication with an engine block 15 of the vehicle.

As shown in FIGS. 2 and 3, the scavenge gear assembly 10 comprises a drive shaft 16 and a slave drive or slave drive shaft 18 disposed adjacent and in parallel relationship with the drive shaft 16. The assembly 10 further comprises a first pair of meshing gears 20 rotationally disposed about the drive shaft 16 and the slave drive 18. The first pair of meshing gears 20 comprises a first drive gear 22 and a first slave gear 24 identical to the first drive gear 22. As shown, the first drive gear 22 is rotationally disposed about the drive shaft 16 to thereby rotate about a longitudinal axis of the drive shaft 16. Likewise, the first slave gear 24 is rotationally disposed about the slave drive 18 to thereby rotate about a longitudinal axis of the slave drive 18. Moreover, the first drive gear 22 and first slave gear 24 rotate about their respective axis in rotational meshing cooperation for torque transmission. In this embodiment, each of the first drive gear 22 and the first slave gear 24 has teeth 26, 28 equally formed thereabout.

In this aspect, the assembly 10 further comprises a second pair of meshing gears 30 rotationally disposed about the drive shaft 16 and the slave drive 18. The second pair of meshing gears 30 comprises a second drive gear 32 and a second slave gear 34 identical to the second drive gear 32. As shown, the second drive gear 32 is rotationally disposed about the drive shaft 16 to thereby rotate about the longitudinal axis of the drive shaft 16 and the second slave gear 34 is rotationally disposed about the slave drive 18 to thereby rotate about the longitudinal axis of the slave drive 18. Moreover, the second drive gear 32 and the second slave gear 34 rotate about their respective axis in rotational meshing cooperation for torque transmission. In this embodiment, each of the second drive gear 32 and the second slave gear 34 has teeth 36, 38 equally formed thereabout.

As shown, the second pair of meshing gears 30 is disposed linearly adjacent to the first pair of meshing gears 20. That is, the second drive gear 32 is disposed linearly adjacent to the first drive gear 22 along the longitudinal axis of the drive shaft 16. Moreover, the second slave gear 34 is disposed linearly adjacent to the second slave gear 34 along the longitudinal axis of the slave drive 18. The assembly 10 further comprises a dividing plate 42 disposed between the first and second pair of meshing gears 30.

In one embodiment, the first pair of meshing gears 20 and the second pair of meshing gears 30 have a timing or tooth spacing of about ⅜ of a tooth spacing (or ⅜N of a gear rotation) relative to each other for torque transmission of scavenge oil. In other words, the second pair of meshing gears 30 has about ⅜ of a tooth spacing relative to the first pair of meshing gears 20. That is, the second drive gear 32 is rotated ⅜ of one tooth spacing about the drive shaft 16 relative to the first drive gear 22, where one tooth spacing may be measured as angularly or radially from one tooth peak to an adjacent tooth peak of a gear.

The term "about" as used herein is known by those skilled in the art. Alternatively, the term "about" may be interpreted to mean+/−2 degree or +/−8% tooth spacing.

In another embodiment, the tooth spacing of the first and second drive gears 22, 32 may be the average of a first optimum for reducing pumping pulsations and a second optimum for reducing meshing pulsations. When in motion, each gear has an unsteady pulsation or noise at the outer diameter of the gear. Such pulsation is related to the number of teeth (or a multiple thereof). For example, the first drive gear 22 (a first gear) has an unsteady pulsation at its outer diameter and related to its seven teeth 26. In this example, to cancel out the unsteady pulsation, the second drive gear 32 (an adjacent gear) is timed to have its pulsations out of phase with the first drive gear 22. A primary frequency of the pulsations may be represented by N pulsations per revolution or number of teeth per gear. Multiples of the frequency will also be present. Thus, the amount of revolutions made by the first drive gear 22 to generated one wavelength of the frequency will be 1/N revolutions. In this example, to maximize the cancellation of the frequency, the second drive gear 32 (the adjacent gear) is to be spaced by half of the wavelength, or ½N. Hence, the second drive gear 32 will be timed such that the teeth 36 are timed ½N revolutions from the first drive gear 22.

Moreover, at a meshing area M of the gears, there are 2N meshing events that happen per revolution. As shown, each meshing event is created from a tooth peak P and a gear trough T between a pair of meshing gears, e.g., the first pair of meshing gears 20. Each meshing event then happens every ½N of gear rotation, where a rotation is one full rotation. Thus, every ½N revolution generates one wavelength of frequency. In this example, for the adjacent gear (the second drive gear 32) to generate a wave out of phase, the second drive gear 32 is timed ½ of this wavelength. Hence, the adjacent gear should be timed at ½*½N, which is ¼N. Therefore, the adjacent gear is timed a quarter of a gear tooth spacing from the first gear.

Thus, the timing of the adjacent gear (e.g., the second drive gear 32) from the first gear (e.g., the first drive gear 22) may have two optimums for reducing each local pulsation. For reducing pumping pulse at the outer diameter of the gear, a first optimum may be represented by: ½ tooth spacing (or ½N). For reducing meshing pulse near the meshing area of gears, a second optimum may be represented by: ¼ tooth spacing (or ¼N). Hence, tooth spacing or an average of the first optimum and the second optimum may be represented by:

$$\frac{\frac{1}{4N} + \frac{1}{2N}}{2} = \frac{3}{8N}$$

As depicted in the drawings, the assembly 10 comprises a plurality of sets or pairs of meshing gears rotationally disposed about the drive shaft 16 and the slave drive 18 for a multi-stage scavenge pump. For purposes of describing the present disclosure, only the first pair and the second pair of meshing gears will be discussed herein. However, it is to be understood that the assembly may comprise a plurality of sets of meshing gears for a multi-stage scavenge pump without departing from the spirit and scope of the present disclosure.

Referring to FIG. 4, the drive shaft 16 comprises a first keyway 44 formed thereon and a second keyway 46 formed longitudinally adjacent the first keyway 44. The first drive gear 22 has a key matingly disposed in the first keyway 44 and the second drive gear 32 has a key matingly disposed in the second keyway 46 such that the first and second drive gears 22, 32 are disposed longitudinally adjacent to each other with about a ⅜ of a tooth spacing relative to each other. In this example, the first keyway 44 is angularly aligned with the apex 48 of one tooth of the first drive gear 22 and the second keyway 46 is angularly aligned with the apex 50 of one tooth of the second drive gear 32. It is to be understood that each of the first drive gear 22 and the second drive gear 32 is locked in orientation with its respective tooth apex by way of its key. That is, the key is matingly inserted in the keyway to thereby lock the gear in orientation with its respective apex. As a result, the first and second drive gears are locked in orientation and have about ⅜ of a tooth spacing relative to each other.

By way of example, the second keyway 46 is formed on the drive shaft 16 and angularly spaced about 19.29 degrees relative to the first keyway 44 to provide about ⅜ of a tooth spacing. In this example, the second keyway 46 has a tooth offset of about 0.38 tooth relative the first keyway 44. However, it is to be understood that the first keyway 44 and the second keyway 46 may be angularly spaced at other degrees without departing from the spirit and scope of the present disclosure so long as the first pair of meshing gears 20 and the second pair of meshing gears 30 have about ⅜ of a tooth spacing. Accordingly, it is also appreciated that the first keyway 44 and the second keyway 46 may be tooth offset at other suitable values without departing from the spirit and scope of the present disclosure so long as the first pair of meshing gears 20 and the second pair of meshing gears 30 have about ⅜ of a tooth spacing.

In this example, each of the first and second drive gears 22, 32 comprises seven teeth. In one embodiment, each of the first drive gear 22, the first slave gear 24, the second drive gear 32 and the second slave gear 34 has seven teeth disposed thereabout.

In another embodiment, the first drive gear 22, the first slave gear 24, the second drive gear 32 and the second slave gear 34 is a spur gear. In yet another embodiment, the assembly 10 further comprises a first end plate 62 disposed on an end pair of meshing gears (here, the first pair of meshing gears 20) and an opposing second end plate 64 disposed on an opposing end of a pair of meshing gears (here, the second pair of meshing gears 30).

It is to be understood that each pair of meshing gears is to be separated by dividing plates or end plates on each side thereof to thereby separate each pair of meshing gears from an adjacent or neighboring pair of meshing gears. For example, for the assembly 10, a side plate is disposed between adjacent pairs of meshing gears. Moreover, an end plate or a dividing plate is disposed on each end of the assembly. Alternatively, the pairs or sets of meshing gears may be disposed in a housing that separates each set of gears without departing from the spirit and scope of the present disclosure.

FIG. 5 is a graph of outlet pressure (absolute pressure, kPa vs. crankangle) of four pairs of identical meshing gears having seven teeth per gear and differing tooth spacing. The tooth spacing include zero of a tooth spacing, ¼ of a tooth spacing, ⅜ of a tooth spacing, and ½ of a tooth spacing. As shown, the meshing gears with ⅜ of a tooth spacing have the lowest outlet pressure, resulting in lower aeration.

Figure 6:
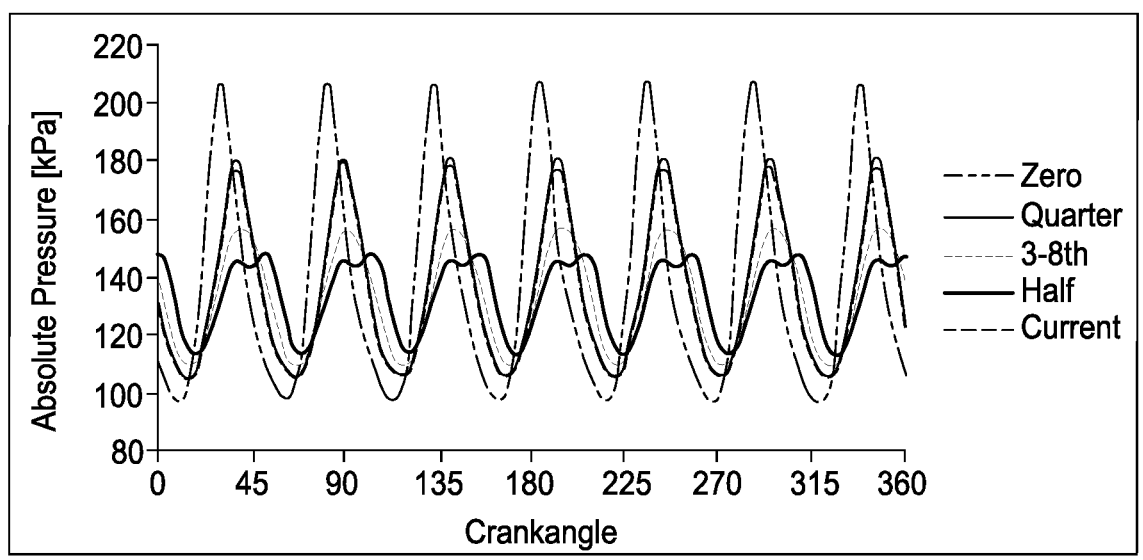
FIG. 6 is a graph depicting pressure amplitude changes of meshing gears having differing tooth spacing.

FIG. 6 is a graph of pressure amplitude changes (absolute pressure, kPa vs. crankangle) of four pairs of identical meshing gears having seven teeth per gear and differing tooth spacing. Data was taken at the widest area of a manifold. In this example, the tooth spacings include zero of a tooth spacing, ¼ of a tooth spacing, ⅜ of a tooth spacing, and ½ of a tooth spacing. As shown, the meshing gears having ⅜ of a tooth spacing is close to having the lowest pressure amplitude, resulting is reduced NVH (noise, vibration, harshness) impact risk.

Figure 7:
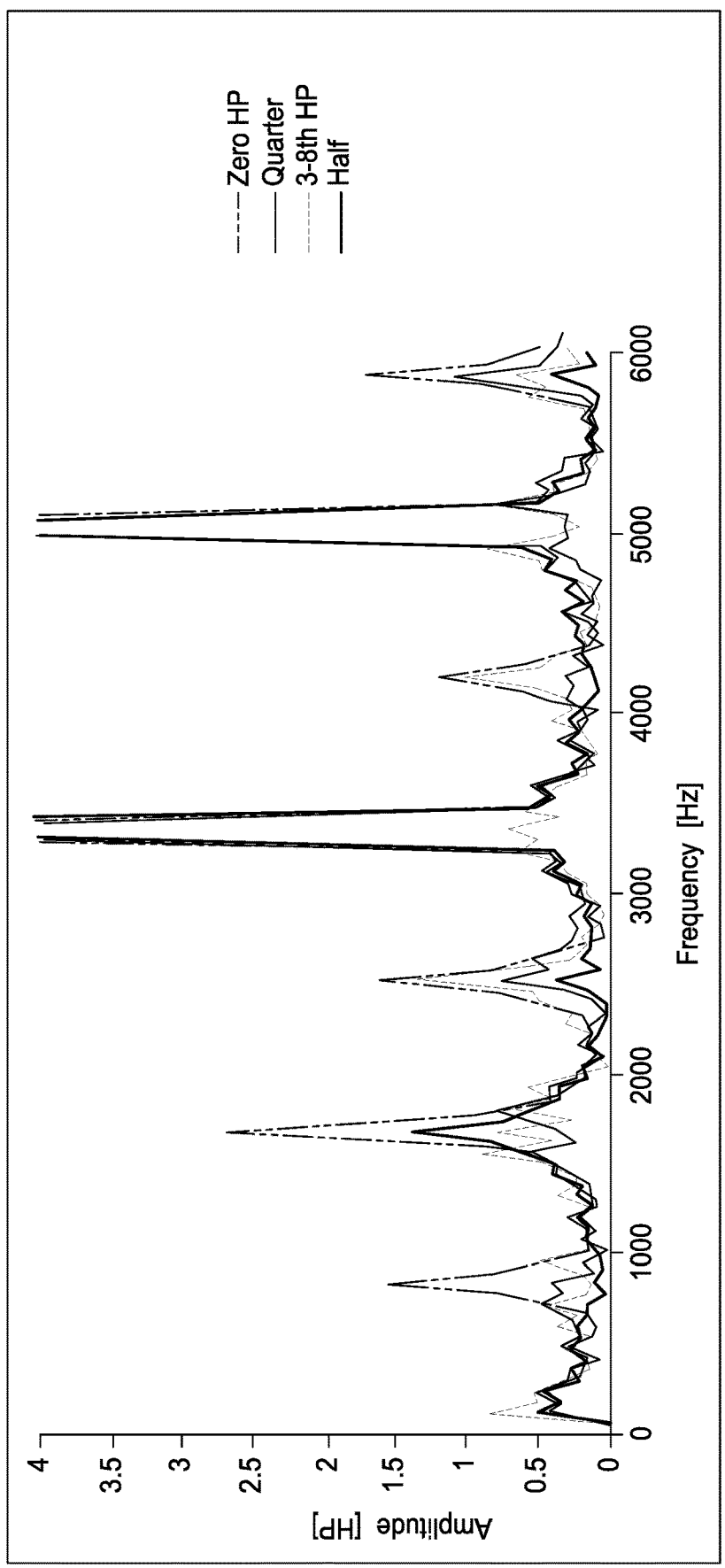
FIG. 7 is a graph comparing drive shaft torque oscillation of meshing gears having differing tooth spacing.

FIG. 7 is a graph comparing drive shaft 16 torque oscillation (amplitude, HP vs. frequency, Hz) of four pairs of identical meshing gears having seven teeth per gear and differing tooth spacing. FIG. 7 depicts gear rotational orders: first order, second order, third order, fourth order, fifth order, sixth order, and seventh order. As an example, the gears with ⅜ of a tooth spacing shows to have the lowest horsepower (HP) at the fourth order, thereby resulting in a lower torque pulsation. A lower torque pulsation translates to an improved shaft fatigue life.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A gear assembly of an oil pump for a vehicle, the gear assembly comprising:
    a drive shaft and a slave drive in parallel relationship;
    a first pair of meshing gears comprising a first drive gear and a first slave gear identical to the first drive gear, the first drive gear rotationally disposed about the drive shaft, the first slave gear rotationally disposed about the slave drive, the first drive gear and first slave gear being in rotational meshing cooperation for torque transmission, each of the first drive gear and the first slave gear having teeth equally disposed thereabout;
    a second pair of meshing gears comprising a second drive gear and a second slave gear identical to the second drive gear, the second drive gear rotationally disposed about the drive shaft, the second slave gear rotationally disposed about the slave drive, the second drive gear and second slave gear being in rotational meshing cooperation for torque transmission, the second pair of meshing gears disposed linearly adjacent to the first pair of meshing gears, each of the second drive gear and the second slave gear having teeth equally disposed thereabout; and
    a dividing plate disposed between the first and second pair of meshing gears,
    wherein the first pair of meshing gears and the second pair of meshing gears have ⅜ of a tooth spacing within +/−2 degrees relative to each other for torque transmission of oil.

2. The assembly of claim 1 wherein each of the first drive gear, the first slave gear, the second drive gear and the second slave gear has seven teeth disposed thereabout.

3. The assembly of claim 1 wherein the drive shaft comprises a first keyway formed thereon and a second keyway formed longitudinally adjacent the first keyway, the first drive gear disposed on the first keyway and the second drive gear disposed on the second keyway such that the first and second drive gears are disposed longitudinally adjacent to each other, and
    wherein the first keyway of the drive shaft is angularly aligned with the apex of one tooth of the first drive gear and the second keyway of the drive shaft is angularly aligned with the apex of one tooth of the second drive gear.

4. The assembly of claim 3 wherein the slave drive comprises a first keyway formed thereon and a second keyway formed longitudinally adjacent the first keyway, the first slave gear disposed on the first keyway and the second slave gear disposed on the second keyway such that the first and second slave gears are disposed longitudinally adjacent to each other, and
    wherein the first keyway of the slave drive is angularly aligned with the apex of one tooth of the first slave gear and the second keyway of the slave drive is angularly aligned with the apex of one tooth of the second slave gear.

5. The assembly of claim 4 wherein the first keyway and the second keyway of the drive shaft are angularly spaced about 19.29 degrees from each other to provide about ⅜ of a tooth spacing,
    wherein each of the first drive gear, the first slave gear, the second drive gear and the second slave gear has seven teeth disposed thereabout.

6. The assembly of claim 1 wherein each of the first drive gear, the first slave gear, the second drive gear and the second slave gear is a spur gear.

7. The assembly of claim 1 further comprising a first end plate disposed on the first pair of meshing gears and an opposing second end plate disposed on the second pair of meshing gears.

8. The assembly of claim 1 wherein each of the first drive gear, the first slave gear, the second drive gear and the second slave gear is a spur gear.

9. The assembly of claim 1 further comprising a first end plate disposed on the first pair of meshing gears and an opposing second end plate disposed on the second pair of meshing gears.

10. The assembly of claim 1 further comprising a first end plate disposed on the first pair of meshing gears and an opposing second end plate disposed on the second pair of meshing gears.

11. A scavenge gear assembly of a scavenge oil pump for a vehicle, the spur gear assembly comprising:
    a drive shaft and a slave drive in parallel relationship;
    a first pair of meshing gears comprising a first drive gear and a first slave gear identical to the first drive gear, the first drive gear rotationally disposed about the drive shaft, the first slave gear rotationally disposed about the slave drive, the first drive gear and first slave gear being in rotational meshing cooperation for torque transmission, each of the first drive gear and the first slave gear having teeth equally disposed thereabout;
    a second pair of meshing gears comprising a second drive gear and a second slave gear identical to the second drive gear, the second drive gear rotationally disposed about the drive shaft, the second slave gear rotationally disposed about the slave drive, the second drive gear and second slave gear being in rotational meshing cooperation for torque transmission, the second pair of meshing gears disposed linearly adjacent to the first pair of meshing gears, each of the second drive gear and the second slave gear having teeth equally disposed thereabout; and a dividing plate disposed between the first and second pair of meshing gears, wherein the first pair of meshing gears and the second pair of meshing gears have a tooth spacing determined by an average of a sum of a first optimum for reducing pumping pulse and a second optimum for reducing meshing pulse, wherein the first optimum is represented by ½N and wherein the second optimum is represented by ¼N, where N is number of teeth per gear, having ⅜ of a tooth spacing within +/−2 degrees relative to each other for torque transmission of oil.

12. The assembly of claim 11 wherein each of the first drive gear, the first slave gear, the second drive gear and the second slave gear has seven teeth disposed thereabout.

13. The assembly of claim 11 wherein the drive shaft comprises a first keyway formed thereon and a second keyway formed longitudinally adjacent the first keyway, the first drive gear disposed on the first keyway and the second drive gear disposed on the second keyway such that the first and second drive gears are disposed longitudinally adjacent to each other, and wherein the first keyway of the drive shaft is angularly aligned with the apex of one tooth of the first drive gear and the second keyway of the drive shaft is angularly aligned with the apex of one tooth of the second drive gear.

14. The assembly of claim 13 wherein the slave drive comprises a first keyway formed thereon and a second keyway formed longitudinally adjacent the first keyway, the first slave gear disposed on the first keyway and the second slave gear disposed on the second keyway such that the first and second slave gears are disposed longitudinally adjacent to each other, and wherein the first keyway of the slave drive is angularly aligned with the apex of one tooth of the first slave gear and the second keyway of the slave drive is angularly aligned with the apex of one tooth of the second slave gear.

15. The assembly of claim 14 wherein the first keyway and the second keyway of the drive shaft are angularly spaced about 19.29 degrees from each other to provide about ⅜ of a tooth spacing.

16. A vehicle having a scavenge gear assembly for a scavenge oil pump, the vehicle comprising:

a chassis;

a body supported by the chassis, the body including a motor compartment and an occupant zone, the motor compartment including a scavenge gear assembly for a scavenge oil pump of the vehicle, the assembly comprising:

a drive shaft and a slave drive in parallel relationship;

a first pair of meshing gears comprising a first drive gear and a first slave gear identical to the first drive gear, the first drive gear rotationally disposed about the drive shaft, the first slave gear rotationally disposed about the slave drive, the first drive gear and first slave gear being in rotational meshing cooperation for torque transmission, each of the first drive gear and the first slave gear having teeth equally disposed thereabout;

a second pair of meshing gears comprising a second drive gear and a second slave gear identical to the second drive gear, the second drive gear rotationally disposed about the drive shaft, the second slave gear rotationally disposed about the slave drive, the second drive gear and second slave gear being in rotational meshing cooperation for torque transmission, the second pair of meshing gears disposed linearly adjacent to the first pair of meshing gears, each of the second drive gear and the second slave gear having teeth equally disposed thereabout;

a dividing plate disposed between the first and second pair of meshing gears; and wherein the first pair of meshing gears and the second pair of meshing gears have ⅜ of a tooth spacing within +/−2 degrees relative to each other for torque transmission of scavenge oil.

17. The assembly of claim 16 wherein the drive shaft comprises a first keyway formed thereon and a second keyway formed longitudinally adjacent the first keyway, the first drive gear disposed on the first keyway and the second drive gear disposed on the second keyway such that the first and second drive gears are disposed longitudinally adjacent to each other, and wherein the first keyway of the drive shaft is angularly aligned with the apex of one tooth of the first drive gear and the second keyway of the drive shaft is angularly aligned with the apex of one tooth of the second drive gear.

18. The assembly of claim 17 wherein the slave drive comprises a first keyway formed thereon and a second keyway formed longitudinally adjacent the first keyway, the first slave gear disposed on the first keyway and the second slave gear disposed on the second keyway such that the first and second slave gears are disposed longitudinally adjacent to each other, and wherein the first keyway of the slave drive is angularly aligned with the apex of one tooth of the first slave gear and the second keyway of the slave drive is angularly aligned with the apex of one tooth of the second slave gear.

19. The assembly of claim 18 wherein the first keyway and the second keyway of the drive shaft are angularly spaced about 19.29 degrees from each other to provide about ⅜ of a tooth spacing.

20. The assembly of claim 16 wherein each of the first drive gear, the first slave gear, the second drive gear and the second slave gear is a spur gear.

* * * * *